Feb. 13, 1968 HUGH L. DRYDEN, DEPUTY 3,369,223
ADMINISTRATOR OF THE NATIONAL AERONAUTICS
AND SPACE ADMINISTRATION
INCREMENTAL TAPE RECORDER AND DATA RATE CONVERTER
Filed Nov. 16, 1965
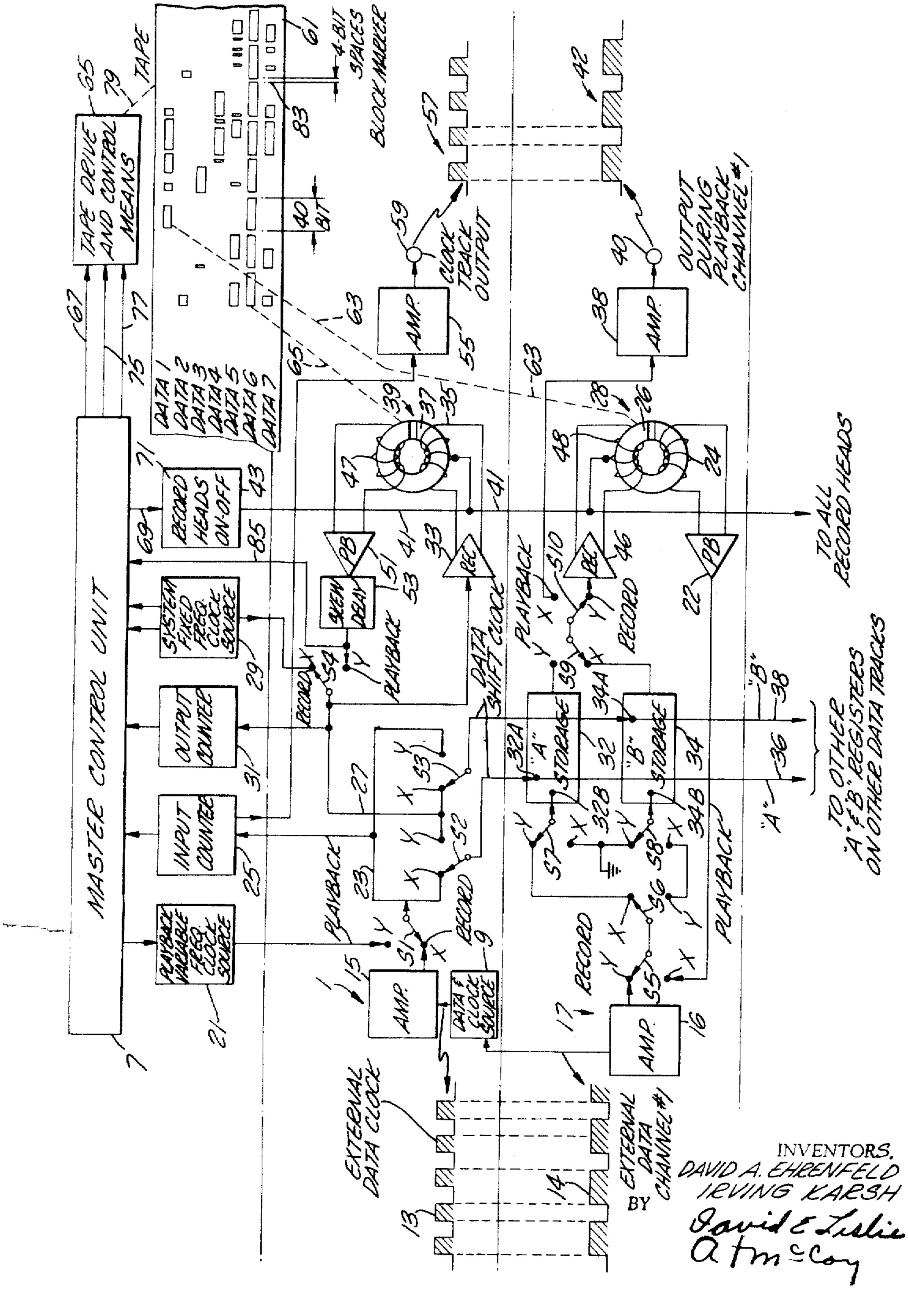
INVENTORS.
DAVID A. EHRENFELD
IRVING KARSH
BY
David E. Lislie
Atty McCoy 3,369,223

INCREMENTAL TAPE RECORDER AND DATA RATE CONVERTER

Hugh L. Dryden, Deputy Administrator of the National Aeronautics and Space Administration, with respect to an invention of David A. Ehrenfeld, South Pasadena, and Irving Karsh, Los Angeles, Calif.

Filed Nov. 16, 1965, Ser. No. 508,170
7 Claims. (Cl. 340—172.5)

*Origin of the invention*

The invention described herein was made in the performance of work under a NASA contact and is subject to the provisions of Section 305 of the National Aeronautics and Space Act of 1958, Public Law 85–568 (72 Stat. 435; 42 USC 2457).

The present invention relates to means and techniques useful in recording data in digital form and to reproduction of such data so recorded.

Briefly, the system described herein involves an improved data storage system capable of storing digital data in a high density format on magnetic tape notwithstanding that the incoming data which is to be recorded occurs at a slow rate, the system having the further capability of reproducing the recorded data at an output rate selectable by the user.

There are many instances in which it is desirable to record incoming data on a number of magnetic tape channels, with the incoming data rate being from a few bits per second or even per hour to perhaps a thousand or two thousand bits per second considered on a per channel basis. Conventional recording means for doing so are of necessity very wasteful of recording tape, since a large amount of tape may be used in storing a small amount of information, particularly so because of the start and stop characteristics of the tape transport. In an attempt to minimize tape requirements, there have heretofore been developed recorders, usually referred to as incremental recorders, employing means for intermittently moving the recording tape, and such means usually involves the use of stepping motors.

In such prior art arrangements, when the incoming data is detected, a signal is developed for actuating the stepping motor and during its operation the data is recorded. A limitation on arrangements of this character arises from limitations on the speed with which such stepping motors can be reliably actuated—normally 100 to 200 steps per second. On the other hand, there are many instances where it is desired to accommodate variable data rates which on occasion may exceed 100 bits per second. In this area no satisfactory equipment exists which will accommodate these higher rates and which will at the same time efficiently handle much slower data input rates present in the same input signal system. A further limitation or disadvantage of conventional incremental recorders is that difficulties arise in playing back the previously recorded data incrementally because of problems arising out of registration, and thus, tapes recorded on incremental recorders are usually played back continuously, with the output rate of data from such tape being dependent on playback tape speed. In many cases, it is desirable to clock out the recorded data at a rate selectable by the user, and one feature of the present invention involves provision of means whereby this result may be accomplished.

In accordance with the present invention, data is recorded on a magnetic tape without requiring the tape to start and stop for each data bit of information recorded. Each record or information channel includes a pair of buffer storage registers.

In the typical embodiment of the present invention designed for an incoming data rate of up to 1000 bits per second per channel and using an electrostatic digital tape drive having a start-stop-reverse time of, for example, 5 milliseconds, each of such two buffers in each data channel may have a storage capability of 40 bits. The tape speed generated by the digital tape drive system in the record and playback modes or functions may then be chosen with reference to incoming data clock rate to provide a high data bit packing density of, for example, 556 bits per inch on the recording tape. To obtain the greatest possible data storage for a given length of tape, the present invention has as one of its features the provision of means whereby a combination of reproduce and recording operations are performed during the record mode using a magnetic tape head which has record and reproduce windings on the same gapped core for accomplishing either reading or writing at the same location.

The sequence of operations during the record mode involves generally the use of the above mentioned two buffer storage sections, one of which stores the incoming data at the incoming data clock rate until it is filled at which time, in response to the clock pulses counted by a counter, the incoming data is switched over for reception to the other buffer storage section of the same data channel. Substantially simultaneosly a programmer within the recorder begins a sequence of commands which transfers the information from the filled buffer storage onto the tape. When such one buffer storage section is emptied, the tape drive is given a stop command, and the clock track record head current is locked in the state it went to when recording the 40th data bits. The clock track on tape is thereby erased as the tape comes to a stop. The tape direction is reversed, the record function stops, and the clock track is sensed by the playback electronics. When the clock signal is sensed, the recorder is given a stop command and the tape is stopped with the head resting near the center of the 40 bit block of data just recorded. When the other buffer storage section fills, the tape starts forward again, and the process is repeated. When the tape thus starts forward, the blank space in the clock track is again detected, and in accordance therewith, the data in such other buffer storage section is clocked out and recorded on the tape.

This provision of reversing the tape movement after each buffer storage section has its data recorded on the tape results in efficient use of the tape since then only a very small gap exists between "blocks" of recorded data, the blocks themselves being characterized by a high bit packing density, since the data is clocked at a high rate without tape stoppage between adjacent recorded bits in the same block.

The present invention also has as one of its features that during playback for transferring the recorded data to, for example, a paper tape, punched card converter, magnetic tape converter, or to a different magnetic tape, the output rate of such transfer may be selected by the operator by adjustment of an oscillator which determines essentially the clock rate at which data is so transferred.

The sequence of operations during such playback mode involves generally the following. The tape is moved forward at substantially constant speed and a block of data is transferred from the tape to one of the previously mentioned buffer storage sections, the same being clocked therein using the clock track previously recorded on the tape. As the clock track is read by its reproduce head, the programmer logic senses the blank space at the end of the data block, referred to herein as a "block-mark" and commands the recorder to stop. During the stop interval, the head will travel into the next data block. The recorder will be given a reverse command and the "block-mark"

is sensed again, which commands the recorder to stop. The recorder now stops with the head resting near the center of the block of data just read out. In the meantime, the other buffer storage section is having its stored data clocked out by an adjustable oscillator which may be set at a clock rate appropriate for the particular readout device being driven.

Thus, by providing a pair of buffer storage sections and control logic together with a digital tape drive system having this feature of automatic tape reversal, the effective "incremental" operation up to the equivalent of 1000 start-stops per second or more may be achieved. Actual tape starts and stops are on the order of 25 per second when dual forty-bit storage elements on each data track are employed and the incoming data rate is 1000 bits per second.

The arrangement is thus particularly useful in applications involving, for example, a magnetic tape to paper tape or punched card converters, punched card or paper tape to magnetic tape converters, and generally whenever input data is to be stored efficiently and conversely when stored data is to be played back to an output device requiring a specific data rate to operate satisfactorily. The present arrangement is believed also to be well suited to integration with computers because of the much denser data storage accomplished by the unit as compared with conventional data recorders. It is also possible for computers to be programmed to prepare output tapes having a very high packing density which can then be used to drive lower speed print-out devices, and this would enable more efficient use of the computer time since ordinarily much computer time is lost, waiting for the input-output devices to divulge or accept information.

It is therefore a general object of the present invention to provide improved means and techniques for overcoming the disadvantages and limitations in the prior art arrangements discussed above, and further, to achieve the new functions and results also indicated above.

A specific object of the present invention is to provide an improved arrangement of this character capable of storing digital data in a high density format and substantially independent of the incoming data rate.

Another specific object of the present invention is to provide an improved arrangement of this character wherein data recorded in a high density format may be reproduced at an output rate selectable over a wide range of rates by the user.

Another specific object of the present invention is to provide an improved arrangement of this character featured by the fact that data is recorded in blocks with only a small space between such recorded blocks.

Another specific object of the present invention is to provide an improved arrangement of this character wherein a recording of a clock signal is used to control tape movement.

Another specific object of the present invention is to provide an improved arrangement as set forth in the preceding paragraph, in which a blank space in the clock signal recording is used to effect either initiation of a recording operation or a reproduce operation, or in general to stop movement of the tape.

Another specific object of the present invention is to provide an improved arrangement of this character featured by the fact that blocks of information are sequentially recorded and that after a block of information is recorded, the tape has its direction of movement automatically reversed and then stopped, in accordance with information in a recording of a clock signal used in effecting the recording.

The features of the present invention which are believed to be novel are set forth with particularity in the appended claims. This invention itself, both as to its organization, and manner of operation, together with further objects and advantages thereof, may be best understood by reference to the following description taken in connection with the accompanying drawings, in which:

FIGURE 1 illustrates a system embodying features of the present invention.

*Description of circuitry*

The circuit as illustrated includes ten single pole, double throw switches S1–S10, inclusive, which in some forms of the invention may be the switches of relays or in other forms of the invention may be solid state switching elements with in each case the switches being operated in accordance with signals developed in the master control unit 7.

As illustrated, these switches S1–S10 are each in one of their two possible conditions wherein in each data channel (only data channel 1 being specifically illustrated to avoid redundancy) an "A" storage unit is receptive for filling with incoming data, and a companion "B" storage unit in the same channel is conditioned for recording data previously stored therein.

For convenience of explanation, the switches S1–S10 are each designated as having a pair of stationary contacts X and Y, and the movable switch arm cooperating with such contacts are designated by the same character which designates the particular switch. Thus, for example, S1 is used to designate the entire switch as well as the movable arm thereof.

The system has its input circuit connected to a source 9 of data and clock signals. The general nature of these signals is shown at 13 and 14, respectively, and is correspondingly applied to the input circuit of amplifiers 15 and 16 in clock channel 17 and data channel 1, respectively, the output circuits of these amplifiers being connected respectively to the X contact of switch S1 and the Y contact of switch S5. The Y contact of switch S1 is connected to the output circuit of a variable frequency clock source 21 used during a playback function. The X contact of switch S5 is connected to the input circuit of a playback amplifier 22 having its output circuit connected to a playback winding 24 on an air-gapped core 26 of a combined record-reproduce head 28.

The movable arm of switch S1 is connected to a wire 23 which is connected to: the X contact of switch S2; the Y contact of switch S3; and the input circuit of a counter-circuit 25 which, as described herein, functions to perform a control operation after it receives a predetermined number of pulses comprising the clock signal 13.

The interconnected X and Y contacts of switches S2 and S3, respectively, are connected to a wire 27 connected to: the movable contact of switch S4 having its stationary contact X connected to a fixed frequency clock source 29; the input circuit of a counter 31 for performing a control operation described herein after its reception of a predetermined number of pulses; and the input circuit of a clock signal record amplifier 33 having its output circuit connected to a center tapped recording winding 35 on an air-gapped core 37 of a combined record-reproduce head 39, the center tap of winding 35 being connected to a wire 41 which is connected to an ON-OFF control circuit 43 for rendering the recording head ineffective under certain conditions.

A reproduce winding 47 on core 37 is connected to the input circuit of a playback amplifier 51 illustrated as having its output circuit connected to a skew delay network 53, the output of such network being connected to: the stationary contact of switch S4; and the master control unit 7.

Explaining further the illustrated circuitry of data channel 1 which is representative also of other data channels, for example, comprising a total of six in number, the movable arms of switches S5 and S6 are interconnected with the stationary contacts X and Y of switch S6 being connected respectively to the stationary contact X of switch S7 and the stationary contact X of switch S8. Contact X of switch S7 is interconnected with contact Y of switch S8, these two contacts being grounded. The movable contacts of switches S7 and S8 are connected respectively to an input circuit of a corresponding one of the "A" storage unit 32 and "B" storage unit 34, respectively. A second input terminal of storage units 32 and 34 is connected respectively to the corresponding movable arm of switches S2 and S3 via a corresponding wire 36 and 38 which wires are connected to like data channels, as indicated by the arrows at the lower ends of wires 36 and 38.

The output circuit of "A" and "B" storage units 32 and 34 is connected respectively to the Y and X contacts of switch S9 having its movable arms connected to the movable arm of switch S10. Switch S10 has its stationary contact X connected to the input circuit of amplifier 38 having an output terminal 40 on which appear data signals of the charatcer illustrated at 42 during the playback function, the other contact Y of switch S10 being connected to the input circuit of a record amplifier 46 having its output circuit connected to a center tapped winding 48 on core 26, the center tap of winding 48 being connected to the previously mentioned wire 41 which likewise is connected to like center taps on a record winding in each of the other data channels, as indicated by the arrow at the lower end of wire 41.

*Description of record mode or function*

While the record mode is described specifically under this heading, the following Switch Position Chart may facilitate an understanding of the operation described hereunder as well as the operation during the playback mode or function described under the next heading.

SWITCH POSITION CHART

| Condition | S1 | S2 | S3 | S4 | S5 | S6 | S7 | S8 | S9 | S10 |
|---|---|---|---|---|---|---|---|---|---|---|
| Record Mode: | | | | | | | | | | |
| "A" Storage Fills / "B" Storage Emptys | X | X | X | X | Y | X | Y | Y | X | Y |
| "A" Storage Emptys / "B" Storage Fills | X | Y | Y | X | Y | Y | X | X | Y | Y |
| Playback Mode: | | | | | | | | | | |
| "A" Storage Fills / "B" Storage Emptys | Y | Y | Y | Y | X | X | Y | Y | X | X |
| "A" Storage Emptys / "B" Storage Fills | Y | X | X | Y | X | Y | X | X | Y | X |

In explanation of the above chart, the various X and Y designations correspond to those contacts engaged by the movable arm of the related switches designated in like manner by S1–S10 under the various conditions set forth therein.

In the record mode specifically exemplified in the drawings, the following description begins with the assumption that initially no data is stored in either one of the two "A" and "B" storage units 32, 34.

It will be demonstrated that first the "A" storage unit is filled with information after which such information is recorded; and while such information is being recorded, the other companion storage unit "B" is accepting and storing information which is subsequently recorded during that time when the "A" storage unit is accepting and storing data under the condition shown in FIG. 1. The "A" and "B" units thus alternately transfer information stored therein to a recording tape 61, with such information stored therein to a recording tape 61, with such information appearing thereon in the form of a recording in the channel designated thereon as DATA 1, such recording being produced by the recording head 28, as indicated by the dashed line 63. Also recorded on tape 61 at the same time is clock signal data in the form of a recording in the channel designated "CLOCK TRACK 6," such recording being produced by the recording head 69, as indicated by the dashed line 65.

Data is also simultaneously recorded in the other data channels, designated as DATA 2, 3, 4, 5 and 7, using channels indicated with and connected to channel 1 as previously indicated.

During the time that information is being thus transferred from the B storage unit for recording purposes at a high rate, the A storage unit is refilling itself with new information at a lower rate, as indicated in the above chart and now described in detail under the specific condition illustrated.

In the recording condition illustrated, "A" storage unit 32 has its terminal 32A connected to receive clock pulses 13 through a circuit which includes switches S2, S1 and amplifier 51 and its terminal 32B connected to receive data information through a circuit which includes switches S7, S6, S5 and amplifier 16. Information is thus stored in "A" storage 32 in accordance with an "and" condition, i.e., in accordance with presence simultaneously of both a clock and a data pulse to establish either a 0 or a 1 information bit, depending upon the absence or presence of a data pulse at the time of occurrence of a clock pulse. The clock pulses are applied also through switch S1 and wire 23 to an input counter 25 which counts the number of such clock pulses, and when a predetermined number has been so counted, for example, 40 in number corresponding to 40 bits of information, the counter 25 functions to develop a signal applied, for example, to energize relay coils for switches S2, S3, S6, S7, S8 and S9 to change each of their conditions shown to its other condition.

In this changed condition accomplished for emptying "A" storage unit of its previously stored information and to record such information in the process of emptying, the switches S2, S3, S6, S7, S8 and S9, all mentioned in the previous paragraph, now perform different functions. Switch S2 now applies clock pulses of a higher rate to terminal 32A from source 29 through a circuit which includes switch S4 (unaltered from its previous condition), wire 27, and switch S2 in its altered condition; switch S3 in its now altered condition connects clock terminal 34A of the other storage unit 34 to clock source 9 via wire 23 and switch S1 which remains in its unaltered condition for again supplying the next series of pulses from source 9 to counter 25; switches S6 and S8 in their altered positions now condition the B storage unit 34 for reception of data pulses from source 9 through a circuit which includes switches S5, S6 and S8; switch S7 in its altered condition grounds terminal 32B so that the clock signals now applied to terminal 32A from source 29 result in the sequential transfer of stored information to the recording head 28 via a circuit that includes: switch S9 in its altered condition, switch S10, the record amplifier and record winding 48. A block of data corresponding to 40 bits of information are thus recorded in DATA 1 channel; and also clock signals are simultaneously recorded in Clock Track 6, these clock signals corresponding to the system clock signals which are applied from source 29 via switch S4 (unaltered from its previous condition), and record amplifier 33 to record winding 35 on head 39. This recording of a block of data signals and corresponding clock signals occurs at a rate higher than the rate at which data is stored in storage unit 34.

Of course, during the time that such recording is taking place, the magnetic tape 61 is moving forwardly and the common lead 41 is so connected as to render the heads 28 and 39 effective for accomplishing this recording. For these two latter purposes, the master control unit 7 functions to issue a forward command signal to the tape drive means 65 via lead 67 and also issues a signal via lead 69 to a "Record Heads ON-OFF" control 71 which, for example, may be in the form of a relay which when energized causes the lead 41 to be connected to minus 6 volts to render the recording heads effective.

After a block of data and accompanying clock signals are thus recorded, the master control unit 7 issues a stop command via lead 75 to the tape drive means 65 to stop tape movement, and also issues a signal to the lead 69 to inhibit record current in windings 35 and 48 from changing. After the tape movement is thus stopped and the recording heads are disabled, the master control unit 7 issues a tape reverse command via lead 77 to the tape drive means 65 to cause the tape to move in a reverse direction after which it is automatically stopped, with the previously recorded portion of the tape now being positioned adjacent to the heads 26 and 39.

For this latter purpose, in this composite recording operation wherein successive blocks of data are recorded, the clock signals are recorded in blocks having a length, as indicated, of 40 bits (corresponding to the individual storage capacity of each unit 32, 34), with a 4 bit spacing therebetween, such latter 4 bit spacing being designated as a block marker 83 and which is used for controlling the operation of the tape drive means 65.

Thus, when the tape is being moved in its reverse direction by means 65 operatively connected thereto as indicated by the dashed line 79, the presence of the previously recorded clock signals are detected by reproduce winding 47 on head 39 to produce a signal in accordance with the block marker 83 which is applied through amplifier 51 and delay network 53 to the master control unit 7 for issuing a stop command signal via lead 75 to the tape drive means 65 to thereby automatically position a previously recorded portion of the tape adjacent to the heads 26 and 39.

In other words, after a recording of each block of data (40 bits), the tape movement is stopped, reversed and then stopped again. The first tape movement stopping function is accomplished using counted 29 which counts the system clock signals and produces a stop signal via lead 67 to means 65 and also a reverse signal via lead 77. The second tape movement stopping function is accomplished in accordance with a signal developed on lead 85 when, in the reverse movement of the tape, the clock recording is detected by head 39.

Since the tape is stopped with a previous recording adjacent the recording heads, the control logic is such that a subsequent recording is made only after the tape in its subsequent forward movement travels a predetermined distance. This distance is established in accordance with a signal developed on lead 85 as a result of detection of a block marker 83 after which the recording windings 35 and 48 are rendered effective, and the output of A storage unit 32 or B storage unit 34, as the case may be, together with the system clock signals are applied to these windings 48 and 35, respectively.

*Description of playback mode or function*

In playback, the various switches in FIG. 1 are considered as indicated in the above chart.

The record playback switches S1, S4, S5 and S10 are now in their playback position and may be so conditioned by energizing a coil of a relay having these switches. It will be seen from the above chart that there is an alternate filling and emptying of the storage units during the playback function as is also the case in the above described record mode. It will be understood that during the playback mode the record windings 47 and 48 are rendered ineffective as a result of the "Record Heads ON-OFF" control 43 being in its OFF condition so that erasure of the tape is prevented.

At the beginning of a playback cycle, preparatory to the reproduction of a block of data at terminal 40 and the corresponding reproduction of a block of clock signals at terminal 59, the reproduce heads 28 and 39 are adjacent to the stationary tape, and more particularly adjacent to a block of data immediately preceding that block of data reproduced in the next cycle of operations. In this condition, it will also be assumed for the following description that the B storage unit 34 is in a filled condition and the circuitry is conditioned to fill the empty A storage unit 32. In this latter condition, as indicated by the above chart: switch arm S2 engages its Y contact; S3 engages its Y contact; S6 engages its X contact; S7 engages its Y contact: S8 engages its Y contact and S9 engages its X contact. As a result of prior emptying of storage unit A, the input counter 25 develops a control signal which commands the tape to move forwardly at a constant speed and a block of data is transferred from the tape to the A storage unit 32, the same being suitably clocked into unit 32 in accordance with information on the Clock Track 6. Transfer of such data is prevented until the marker block on the tape is sensed in which latter case a data transfer circuit is enabled using a pulse derived at head 39 from the block marker on the clock track.

In this transfer of data from the tape to storage unit 32, the data pulses detected by reproduce winding 24 after amplification in amplifier 22 are applied through switches S5, S6 and S7 to storage unit terminal 32A; and clock signals detected by reproduce winding 35 after amplification in amplifier 33 are applied through switch S2 to the other storage unit terminal 32B to thereby achieve a storage of this information in unit 32. The clock signals thus transferred are counted in the output counter 29 which, after counting 40 such clock pulses, issues a tape reverse command to the tape driving system. Due to inertia and other effects, the tape does not reverse instantaneously, but travels a distance comparable to at least a four bit spacing on the tape corresponding to the distance of the block marker. In the following reverse movement of the tape, the reproduce winding 35 detects this block marker, produces a pulse in accordance therewith, and such pulse, after amplification in amplifier 51, is applied through skew delay network 53 and lead 85 as a stop command signal to the tape driving system whereupon the tape movement is stopped with the reproduce windings being adjacent to a recording of the data which had just been transferred to unit 32.

During the transfer of this data to unit A, i.e. during its filling, the B storage unit 34 is emptied as follows. In this condition, one storage unit terminal 34B is grounded and clock signals from variable frequency clock source 21 are applied to the other terminal 34A through switches S1 and S3; and also clock signals are applied to input counter 25 which issues a start command to the tape driving system after it counts 40 clock pulses. As the information is clocked out of unit 34 by clock source 21, the output of unit 34 is applied to output terminal 40 through a circuit which includes switch S9, switch S10 and amplifier 38; signals generated by the input counter and amplified in amplifier 55 appear on output terminal 59. The frequency of the clock source 21 may be adjusted or varied automatically.

After the A storage unit is thus filled, it is emptied and B storage unit is filled, these units being switched for this purpose in accordance with the output signal developed by input counter 25 after it counts 40 pulses. In this switched condition, as indicated by the above chart: the switch arm S2 engages its contact X; S3 engages its contact X; S6 engages its contact Y; S7 engages its contact X; S8 engages its contact X; and S9 engages its contact Y.

In this latter case the information previously recorded in unit A now appears at output terminal 40 at a rate dependent upon the frequency of source 21 and clock signals developed by the playback variable frequency clock and the input counter appear at output terminal 59.

It will be appreciated that the art is familiar with various types of controls for tape recorders and reproducers of this character where the tape is advanced on a control signal, is stopped on a control signal and, also in some instances, a control signal is used to stop forward movement and to automatically cause the tape to then reverse its prior direction of movement with the tape being thereafter stopped in response to another control signal and for that reason such means need not be described in detail herein.

In this instance a pulse counter is used to control the tape transport mechanism and such counter may be of many different types. For example, an eight flip flop counter may be used capable of counting from zero to 31 inclusive. Such counter, when used, initiates commands to the tape transport in proper sequence and stops counting on even numbers until such time as commands previously issued have been acted upon. Commands are issued on odd numbers. For example, after giving a command to move tape in the forward command, the counter will wait on an even number until it receives a signal from the transport that tape is moving in the forward direction. Such counter may also function such that substantially the same commands are given to the tape transport in both record and playback modes of operation to thereby reduce the cost and improve the reliability of the system.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

We claim:

1. In a data handling and recording system of the character described, a first data storage means; a second data storage means; a first source of clock signals; a second source of clock signals; transducer means associated with a recording medium; control means for moving said recording medium forwardly, for stopping movement of said recording medium and for reversing the direction of movement of said recording medium with respect to said transducer means; first clock signal counting means for developing a first signal in accordance with the number of signals from said first source; second clock signal counting means for producing a second signal in accordance with a number of pulses from said second clock signal source; connecting means, in a first condition thereof, being effective to connect said first source of clock signals to said first data storage means and also to connect said second source of clock signals to said second storage means; said connecting means, in a second condition thereof, being effective to connect said first source of clock signals to said second storage means and also to connect said second source of clock signals to said first storage means; said connecting means being changed from said first condition to said second condition in accordance with said first signal; forward movement of said recording medium being initiated in accordance with said first signal effecting operation of said control means; said forward movement of said medium being stopped and reversed in accordance with said second signal effecting operation of said control means; said transducer cooperating with a recording of clock signals on said medium for developing a third signal; said reverse movement of said medium being stopped in accordance with said third signal effecting operation of said control means.

2. A data handling and recording system as set forth in claim 1, in which said first source of clock signals is an external source associated with an external source of data signals which are applied contemporaneously to said first data storage means in said first condition of said connecting means and which are applied contemporaneously to said second storage means in said second condition of said connecting means.

3. A data handling and recording system as set forth in claim 1 in which one of said sources of clock signals are signals prerecorded on said recording medium and are effective to develop said third signal.

4. In a data handling and recording system of the character described, a source of data signals; a first source of data clock signals; first information storage means; second information storage means; recording means; connecting means, operative in a first condition, to connect said first storage means to said first source of clock signals and to said data signals to store information in said first storage means; said connecting means, in said first condition, being also operative to connect said second storage means to said recording means for the transfer of data from said second storage means to said recording means; a second source of clock signals connected to said second storage means in said first condition of said connecting means for effecting transfer of data from said storage means to said recording means; said recording means being effective to record clock signals from said second clock source in said first condition of said connecting means whereby said recording means produces a recording of data signals from said second storage means and also clock signals from said second source; said connecting means, in a second condition thereof, being effective to connect said second storage means to said data source and said first clock source; said connecting means, in said second condition, being effective also to connect said second source of clock signals to said first storage means and to transfer data previously recorded in said first storage means together with clock signals from said second clock source to said recording means to produce a recording of said previously recorded data in said first storage means together with clock signals from said second clock source.

5. A data handling and recording system as set forth in claim 4 in which counting means are incorporated for changing said connecting means from said first condition to said second condition in response to the number of clock signals from said first clock signal source.

6. A data handling and recording system as set forth in claim 5 in which said recording means incorporates a recording medium and also means for moving said medium in a forward direction, for stopping movement of said medium and for reversing the direction of movement of said medium; a second clock signal counting means; forward movement of said medium being initiated in response to the number of clock signals counted by said first counting means; the movement of said medium being stopped and reversed in response to the number of clock pulses from said second clock source and counted by said second clock signal counting means; said recording means incorporating transducer means for developing a signal in accordance with previously recorded clock signals; said reverse movement of said medium being stopped in accordance with said signal developed by said transducer means.

7. A data handling and recording system as set forth in claim 6 in which said transducer means incorporates a single structure for recording and reproducing clock signals on and from said medium.

References Cited

UNITED STATES PATENTS

| | | | |
|---|---|---|---|
| 2,905,930 | 9/1959 | Golden | 340—174 |
| 3,012,230 | 12/1961 | Galas et al. | 340—172.5 |
| 3,059,221 | 10/1962 | Page et al. | 340—172.5 |
| 3,130,387 | 4/1964 | Wright et al. | 340—172.5 |
| 3,252,148 | 5/1966 | Mitchell | 340—172.5 |
| 3,323,104 | 5/1967 | Hadley et al. | 340—15.5 |
| 3,333,247 | 7/1967 | Hadley et al. | 340—172.5 |

ROBERT C. BAILEY, *Primary Examiner.*

R. B. ZACHE, *Assistant Examiner.*